July 21, 1936.  F. H. FRIEDMAN  2,048,063
PLANT SPRAYING IMPLEMENT
Filed Oct. 3, 1935
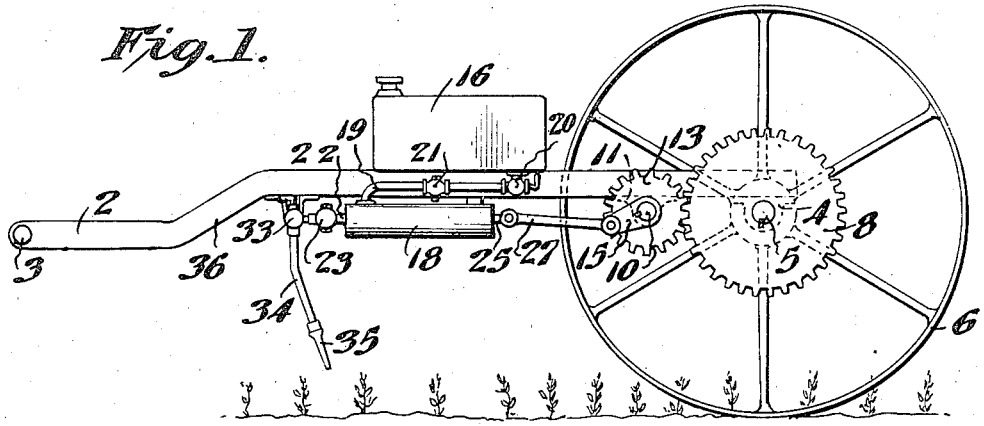
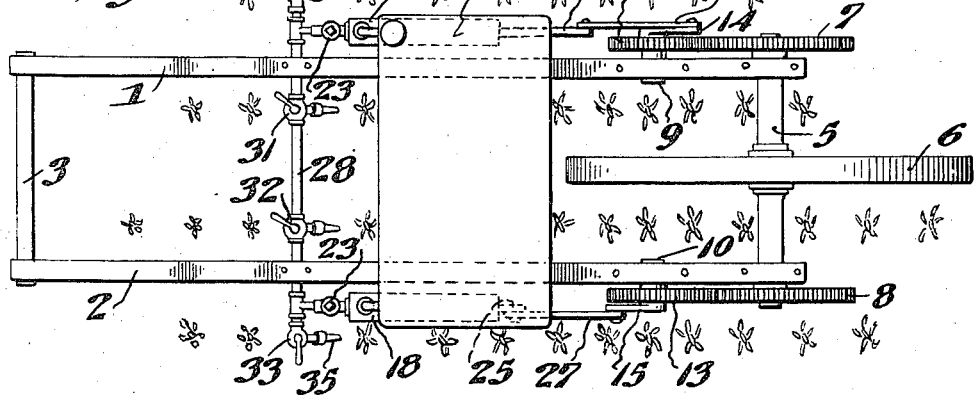
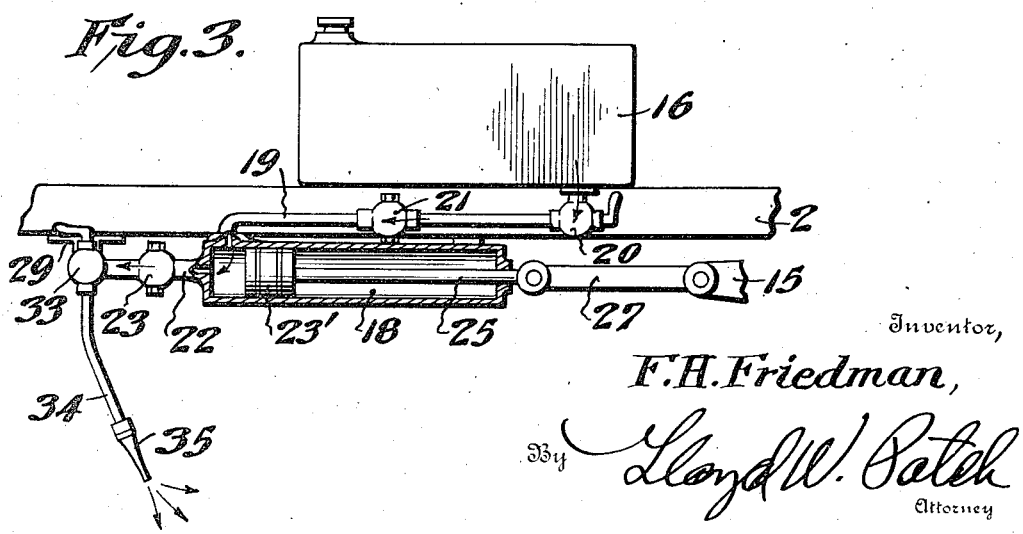
Inventor,
F. H. Friedman,
By Lloyd W. Patch
Attorney

UNITED STATES PATENT OFFICE 2,048,063

PLANT SPRAYING IMPLEMENT

Fred H. Friedman, Chosen, Fla.

Application October 3, 1935, Serial No. 43,403

5 Claims. (Cl. 299—45)

My invention relates to plant spraying implements, and particularly to a hand pushed straddle-row implement to be used by a walking operator to spray growing plants in rows in a field or garden.

An object of my invention is to provide an implement and apparatus that is simple in construction and inexpensive to manufacture, and which will operate and function with positive efficiency even when used by unskilled labor.

Another object is to provide an implement of this character which will spray uniformly a number of rows of plants at one time, while positively directing the spray away from the operator, thus insuring efficient and effective operation and protecting the user from contact with or the effects of poisonous or other injurious spray materials where these are used.

A further object is to provide a plant spraying implement adaptable for use in spraying a plurality of rows of plants and freely and readily adjustable to spray a single row or two or more rows, the construction being such that the amount of liquid as sprayed and the force of each individual spray, as well as the proximity of the spray discharge to the plants, can be adjusted for varying conditions of use.

With the above and other objects and purposes in view, which will be apparent to those skilled in the art, my invention includes and embodies certain novel features of construction and combinations and arrangements of parts, which will be hereinafter more fully set forth in connection with the drawing.

In the drawing:

Figure 1 is a view in side elevation showing a plant spraying implement constructed in accordance with my invention.

Fig. 2 is a top plan view.

Fig. 3 is a fragmentary partial sectional view to better show the pump structure and associated parts.

The supporting frame is made up to be of substantially U-shaped form and consists of the side bars 1 and 2, which can be of channel iron or other suitable material, connected together by a transversely disposed handle bar member 3. At their outer ends, the side bar members 1 and 2 have axle bearing members 4 mounted and secured on the lower sides of the side bars.

An axle 5 is mounted revolubly in the bearings 4 and has a carrying wheel 6 secured in fixed mounting in its middle portion. The ends of axle 5 extend beyond the outer faces of the side bars 1 and 2 and have drive gears 7 and 8 fixedly mounted thereon. Stub shafts 9 and 10 are revolubly mounted in bearings 11, which bearings are also mounted on the lower sides of the side bars 1 and 2, so that the axis of rotation of the stub shafts 9 and 10 will be substantially in line with the axis of rotation of the axle 5. These stub shafts 9 and 10 have thereon driven pinions 12 and 13, which pinions are meshed with the drive gears 7 and 8. Crank arms 14 and 15 are associated with and moved by the driven pinions 12 and 13.

A liquid storage and supply tank 16 is mounted on the upper sides of the side bars 1 and 2 at a point intermediate the axle 5 and the handle 3, so that the weight of this tank, and of its contents, will be substantially balanced and centered upon the side bars. Pump cylinders 17 and 18 are mounted and carried, by suitable brackets or other suitable supporting structure, to be preferably outside of and below the lower faces of the side bars 1 and 2, and these cylinders are substantially lined up with a line taken through the axle 5 and the stub shafts 9 and 10. The two cylinders 17 and 18 are substantially duplicates in their construction and connections, and referring to Fig. 3, liquid supply pipes 19 are connected with the bottom of the liquid supply and storage tank 16 and with one end of each cylinder. A liquid cut off and control valve 20 is provided in each pipe 19 to control the supply of liquid therethrough, while supply check valve 21 will prevent back flow of liquid from the pump cylinder. A liquid discharge pipe 22, leading from the compression end of the cylinder 18, has a liquid discharge check valve 23 therein to prevent back flow of liquid into the pump cylinder 18. A pump piston 23 is mounted for reciprocatory movement in each of the pump cylinders 17 and 18, and the pistons within the respective cylinders 17 and 18 have the piston rods 24 and 25 extending therefrom toward the driven pinions 12 and 13. Pitman rods 26 and 27 connect the piston rods 24 and 25 with the crank arms 14 and 15 respectively. As illustrated in Fig. 2, the driven pinions 12 and 13 are meshed with the drive gears 7 and 8 so that the crank arms 14 and 15 are on opposite sides of the axial center of rotation of the stub shafts 9 and 10, and thus the piston in cylinder 17 will be moved on the instroke or compression stroke while the piston in cylinder 18 is being carried on the outstroke or suction stroke, and the reverse.

A distributing pipe 28 is mounted transversely across beneath the side bar members 1 and 2 and is held in place by brackets 29, or other suitable supports. This distributor pipe has the liquid discharge pipes from the two cylinders 17 and 18 connected therewith so that liquid is supplied under pressure from each of the cylinders 17 and 18 to the distributing pipe 28, and due to the opposite disposition of the crank arms 14 and 15, as set forth above, one of the pumps will be constantly operating on a compression stroke to thus insure a constant and substantially even supply of liquid under pressure from the liquid carrying and storage tank 16 to the distributor pipe 28.

This distributor pipe 28 has a plurality of valve connections 30, 31, 32, and 33 fitted therein at spaced points corresponding in their spacing substantially to the width between rows of plants as growing in a field and with which my improved implement is to be used. Each one of these valved fittings has a pipe 34 extending downwardly therefrom and provided at its end with a liquid spraying or diffusing nozzle 35.

It has been found that by mounting the axle 5, the stub shafts 9 and 10 and the pumps 17 and 18 below the lower faces of the side bar members 1 and 2, and substantially in horizontally aligned relation, and then mounting the liquid storage and carrrying tank 16 above the frame structure, a very convenient and compact structure is provided and at the same time the parts are so disposed so as to require only a minimum effort in pushing the implement across a field and in handling and manipulating the implement. The tubes 34 will of course be made of sufficient length to dispose the liquid spray or diffusing nozzles 35 in positions to accomplish most efficient spraying of the plants growing in the rows. As shown in Figure 1, it has been found desirable to offset the side frame members downwardly, as indicated at 36, so that the handle 3 is placed substantially in line with the center line taken through the pump cylinders and the stub shafts 9 and 10 and the axle 5. With this offset arrangement and formation, the handle 3 is placed lower down for more convenient grasping and manipulation by the operator or user, and at the same time the handle is placed sufficiently low that the operator can raise the handle during use to thus elevate the tube portions 34 and the nozzles 35 to accommodate different heights of plants and to dispose the outlet from the nozzles at different elevations or positions with respect to the plants of the row being sprayed. The two oppositely working pumps will insure a constant and substantially uniform supply of liquid from the storage tank 16 to the crosshead 28 at all times while the implement is being pushed over a field to travel upon the wheel 6. Should it be desired to cut off the supply of spray liquid, this is readily accomplished by means of valve 20 and if it becomes necessary or desirable to cut off the supply of liquid to any of the spray nozzles 35 any one of the valves 30, 31, 32 or 33 in the liquid supply pipe 29 can be closed.

As a single wheel 6 is provided and the cross handle 3 is directly in line with this wheel, the wheel and the operator can travel in the space between adjacent rows of plants, and the spraying mechanism can be adjusted for and used to spray one or more of the parallel rows of plants. Where the implement is being used upon a hillside or upon land otherwise not level, the structure can be readily tilted upon the support of the single wheel, and the operator can hold the structure with the frame level or with the frame tilted laterally to the one side or the other, as the particular field and the conditions of use may require.

From the foregoing it will be seen that I have provided a hand operated plant spraying implement of simple and inexpensive construction which can be used to spray one or more rows of plants, and with which a minimum effort on the part of the user is required since the pumps are working in opposite relation and disposition, the parts being thus better balanced for easier and smoother operation.

While I have herein shown and described only certain specific embodiments and have suggested only certain possible uses of the device of my invention, it will be appreciated and understood that many changes and variations can be made in the form, construction, arrangement, design and assembly of the parts, and in the use of the apparatus, without departing from the spirit and scope of my invention.

I claim:

1. A plant spraying implement comprising, a pair of spaced side frame members, a cross bar handle connecting said side frame members at one end into a frame structure, an axle journalled across the other end of said frame structure, a single wheel on said axle intermediate said side frame members, a liquid containing and storage tank mounted transversely upon the frame structure intermediate the handle bar and the axle, a pump carried adjacent to each of said side bar members, a distributor pipe carried transversely beneath the frame structure and adjacent to the handle bar member, a plurality of nozzles connected at spaced points with said distributor pipe, connections from said pumps to said distributor pipe, liquid supply connections from the tank to said pumps, and operating connections from the ends of the axle to alternately operate said pumps to maintain a constant supply of liquid from the tank to the distributor pipe.

2. A plant spraying implement comprising, a pair of spaced side frame members, a cross bar handle connecting said side frame members at one end into a frame structure, an axle journalled across the other end of said frame structure, a single wheel on said axle intermediate said side frame members, a liquid containing and storage tank mounted transversely upon the frame structure intermediate the handle bar and the axle, a pump carried adjacent to each of said side bar members, a distributor pipe carried transversely beneath the frame structure and adjacent to the handle bar member, a plurality of nozzles connected at spaced points with said distributor pipe, connections from said pumps to said distributor pipe, liquid supply connections from the tank to said pumps, operating connections from the ends of the axle to alternately operate said pumps to maintain a constant supply of liquid from the tank to the distributor pipe, and valves manually settable to control the supply of liquid to said pumps and the force of liquid to said nozzles.

3. A plant spraying implement comprising, a pair of spaced side frame members, a cross bar handle connecting said side frame members at one end into a frame structure, an axle journalled across the other end of said frame structure, a single wheel on said axle intermediate said side frame members, a liquid containing and storage tank mounted transversely upon the frame structure intermediate the handle bar and the axle, a pump carried adjacent to each of said side bar members, a distributor pipe carried transversely beneath the frame structure and adjacent to the handle bar member, a plurality of nozzles connected at spaced points with said distributor pipe, connections from said pumps to said distributor pipe, liquid supply connections from the tank to said pumps, drive gears carried by the ends of said axle and revolved by rotation of the wheel, driven pinions carried by the side frame members meshing with and rotated by said drive gears, oppositely disposed crank arms on said driven pinions, and connections from said crank arms to said pumps to cause alternate operation of the pumps and thus insure a continuous supply of liquid to the distributor pipe.

4. A plant spraying implement comprising, a pair of spaced side frame members, a cross bar handle connecting said side frame members at one end into a frame structure, an axle journalled across the other end of said frame structure, a single wheel on said axle intermediate said side frame members, a liquid containing and storage tank mounted transversely upon the frame structure intermediate the handle bar and the axle, a pump carried adjacent to each of said side bar members, a distributor pipe carried transversely beneath the frame structure and adjacent to the handle bar member, a plurality of nozzles connected at spaced points with said distributor pipe, connections from said pumps to said distributor pipe, liquid supply connections from the tank to said pumps, drive gears carried by the ends of said axle and revolved by rotation of the wheel, driven pinions carried by the side frame members meshing with and rotated by said drive gears, oppositely disposed crank arms on said driven pinions, connections from said crank arms to said pumps to cause alternate operation of the pumps and thus insure a continuous supply of liquid to the distributor pipe, and valves manually settable to control the supply of liquid to said pumps and the force of liquid to said nozzles.

5. A plant spraying implement comprising, a pair of side bar frame members, a cross handle bar connecting said side bar members at one end to form a supporting frame structure, bearings mounted on the under sides of said side bar members adjacent to their free ends, an axle journalled in said bearings, a supporting wheel fixed on said axle intermediate the side bar members, drive gears on the ends of said axle rotated thereby, a liquid containing and storage tank mounted on said frame structure across the side bar members intermediate the axle and the cross handle bar, single action pumps carried by said side bar members beneath the tank, liquid supply connections from the tank to each of said pumps, a distributor pipe carried beneath said side bar members and transversely of the frame structure adjacent to the handle bar, a plurality of valved connections at spaced points throughout the length of said distributor pipe, connections from said pumps to said distributor pipe, spray nozzles connected with the valved connections of the distributor pipe, driven pinions revolubly mounted on said side bar members and in mesh with the drive gears, crank arms on said driven pinions disposed in opposed relation on the two sides of the frame, and pitman rod connections from said crank arms to operate the pumps on power strokes alternately as the implement is pushed across a field to cause rotation of the supporting wheel.

FRED H. FRIEDMAN.